United States Patent [19]

Lassallette et al.

[11] Patent Number: 4,992,795
[45] Date of Patent: Feb. 12, 1991

[54] METHOD AND DEVICE FOR THE VALIDATION OF PLOTS, FOR RADAR, WITH SELF-ADAPTIVE UPDATING

[75] Inventors: Jean-Luc Lassallette, Evry; Guy Desodt, Massy; Eric Potier, Velizy, all of France

[73] Assignee: Thomson-CSF, Puteaux, France

[21] Appl. No.: 418,868

[22] Filed: Oct. 10, 1989

[30] Foreign Application Priority Data

Oct. 11, 1988 [FR] France ............... 88 13340

[51] Int. Cl.$^5$ .................................. G01S 7/02
[52] U.S. Cl. .............................. 342/90; 342/95
[58] Field of Search ..................... 342/90, 95, 96

[56] References Cited

U.S. PATENT DOCUMENTS 3,611,369 10/1971 Maguire .
3,836,964 9/1974 Evans .
3,940,762 2/1976 Ethington et al. .

FOREIGN PATENT DOCUMENTS

0050886 5/1982 European Pat. Off. .
0054646 6/1982 European Pat. Off. .
0235946 9/1987 European Pat. Off. .

Primary Examiner—Thomas H. Tarcza
Assistant Examiner—Mark Hellner
Attorney, Agent, or Firm—Oblon, Spivak, McClelland, Maier & Neustadt

[57] ABSTRACT

To make an "intelligent" selection, in a radar, of the piece of information transmitted to the tracking unit by the extractor, in case of saturation, a method comprising the first step of selecting a set of N attributes ($x_1, x_2, \ldots x_N$) defining the plots given by the extractor. Then quantifying each attribute, in defining intervals in the range of values taken by the attribute and associating, with each N-tuple formed by a combination of values of the attributes, an estimated value of validity of the corresponding plot. Further, for each plot transmitted by the extractor, searching for the N-tuple that corresponds to it, in order to associate the estimated value of validity, assigned to the N-tuple, with the plot.

14 Claims, 6 Drawing Sheets

METHOD AND DEVICE FOR THE VALIDATION OF PLOTS, FOR RADAR, WITH SELF-ADAPTIVE UPDATING

BACKGROUND OF THE INVENTION

1. Field of the Invention

The field of the invention is mainly that of means to limit the saturation of the tracking unit of a radar.

Such means consist of the association, with each plot, of a piece of information on the estimated validity of the plot.

The obtaining of this piece of information on validity then provides for improved processing of the plot thus "informed" or associated with information. If the piece of information on validity can assume several states, which may be continuous or discontinuous, it is possible, for example, to control the saturation of the tracking unit of the radar in selecting the plots transmitted to it by setting a threshold on the piece of information on validity. In another non-restrictive application of the invention, the information on validity may be used for signature analysis or target recognition.

The plots given by the extractor of a radar are most often formed by the agglomeration of detected echo points, or again "echo presence". The elementary echos are combined, by integration and compacting, to form plots with relatively homogeneous general characteristics. These plots are defined by a number of parameters or attributes such as: the mean distance from the radar, the mean angle of sight, the score (number of constituent elementary echos forming the plot), the maximum amplitude of return (intensity of the echos) or, again, attributes related to the shape of the plot (extension in distance or in azimuth, moment of inertia, etc). Other attributes used, for example are attributes that are inherent to the specific type of radar used.

For its part, the tracking unit in a radar essentially performs a data-processing task, designed to identify tracks, namely to interlink plots corresponding to one and the same echo, or group of echos, during successive sweeps of the radar. Each track is defined, for example, by the previous position of a plot, and a speed vector value of the plot. The tracking of a plot involves, notably, motion-prediction techniques using algorithmic tools (Kalman filtering etc.).

Because it is essentially software, the tracking unit is saturable.

2. Description of the Prior Art

Up till now, the techniques used to control the saturation of the tracking unit have consisted in causing a sudden stoppage of the supply of information coming from the extractor, whenever the processing capacity experiences an overflow. This prior art technique has the drawback of depriving the tracking unit of useful information, arbitrarily and at a time when the wealth of information would rather require the attentive tracking of targets.

SUMMARY OF THE INVENTION

It is an object of the invention to overcome this drawback, by supplying a piece of information on validity, for each plot, which would notably enable the information transmitted to the tracking unit to be selected "intelligently" in the event of saturation.

It is also an aim of the invention to provide a piece of information on the validity of each plot, which might be used for any subsequent processing of the plot capable of using an estimation of likelihood.

The notion of the validity or likelihood of a plot, according to the invention, consists in emitting an estimation on the fact that the plot actually corresponds to a useful moving target, and not to a detrimental or undesired echo.

"Harmful" echos correspond, for example, to residues of fixed sea or atmospheric echos or, again, possibly, to active or passive jamming. The discrimination should be such that the rate of identified detrimental plots is maximized, without this operation being done to the detriment of the useful plots.

A complementary aim of the invention, therefore, is to provide discrimination means enabling the simultaneous achieving of these two aims of minimizing the number of false plots transmitted and maximizing the number of true plots transmitted.

Another aim of the invention is to provide means for the self-adaptive updating of the process for assigning each plot its estimated value of validity. The aim sought is to refine this process, in periodically taking into account recent modifications of the nature of the true plots and of the false plots transmitted and, hence, of the useful and undesired environment of the radar.

A concomitant aim is to achieve these updating operations without interrupting the processing of the current plots. It should further be possible to control the updating operation, both on a periodic basis and upon the detection of a sudden change in the environment of the radar.

These aims, as well as others that will appear subsequently, are achieved by means of a process for the validation of plots, for radar, notably designed to be interposed between the extractor and the tracking unit to associate an estimated value of validity with each plot given by the extractor, said method comprising the steps of:

selecting a set of N attributes, defining the plots given by the extractor;

quantifying each attribute, in defining intervals in the range of values taken by said attribute;

associating, with each N-tuple formed by a combination of values of said attributes, an estimated value of validity of the corresponding plot;

for each plot transmitted by the extractor, searching for the N-tuple that corresponds to it, in order to associate the estimated value of validity, assigned to said N-tuple, with said plot.

Advantageously, this method is implemented in a device comprising:

first means to reduce the dynamic range of each plot, formed by a set of addressing tables, each table associating one of the quantified values constituting the N-tuple with each attribute value of said plot;

second means to validate each plot, formed by an addressing table associating, with each N-tuple, an estimated value of validity of the corresponding plot.

In a more sophisticated embodiment, the method of the invention comprises the following steps:

selecting a first set and a second set of attributes designed for the preparation of coefficients of probability, for each plot, of its corresponding to a true plot or to a false plot respectively;

quantifying each attribute of said first and second sets, by defining intervals in the range of values taken by said attribute;

associating, with each combination of the quantified values of said first and second sets of attributes, a first coefficient and a second coefficient of the probability of corresponding to a true plot and to a false plot respectively;

defining, for each plot, an estimated value of validity formed by the ratio of said first and second coefficients of probability.

Advantageously, this second method is implemented in a device comprising:

first parallel means to reduce the dynamic range of each plot formed, firstly, by a first set of addressing tables, each table of which associates one of said quantified values with each attribute value of the first set of attributes and, secondly, a second set of addressing tables, each table of which associates one of said quantified values with each attribute value of the second set of attributes;

second parallel means of conversion, formed by a first addressing table which associates, with the N-tuple of values taken by said first set of attributes, a probability of corresponding to a true plot, and by a second addressing table which associates, with the N'-tuple of values taken by said second set of attributes, a probability of corresponding to a false plot;

third means of validation of each plot, formed by a circuit to compute said estimated value of validity of the plot by the division of said first and second coefficients of probability obtained at output of said second parallel means of conversion.

Preferably, with each plot, there is associated one of the two states, true/false, of a validity bit of the plot, by a comparison of said estimated value of validity with a pre-determined threshold of validity.

Advantageously, said threshold of validity is variable as a function of the state of saturation of the tracking unit.

In one advantageous mode of implementation of the invention, the plot validation method includes means for the self-adaptive updating of the estimated values of validity of the plots, comprising at least one of the following steps:

updating the quantification values of the attributes defining each plot as a function of the plots received;

updating the estimated values of validity of the plots for each combination of quantified values of attributes as a function of the final decisions on validity taken by means for using plots "informed" by their estimated value of validity.

Advantageously, said step for updating the quantification values of attributes consists in redefining the intervals subdivided in the range of values taken for each definition attribute of the plots, within a new batch of received plots, said updating subdivision being preferably done according to a logic of isopopulation or isosensitivity.

According to another advantageous characteristic, said step for updating the estimated values of validity of the plots consists in assigning, to each N-tuple of quantified values of attributes, an estimated value of validity obtained for the sub-set of plots verifying said N-tuple, within a new batch of received plots.

Preferably, said updating operations are done by introducing, into each of said new batches of plots, a sample of plots representing current values of quantification and current estimated values of probability respectively.

BRIEF DESCRIPTION OF THE DRAWINGS

Other features and advantages will appear from the following description of a preferred embodiment of the invention, given by way of a non-restrictive illustration, and from the appended drawings, wherein.

DESCRIPTION OF THE PREFERRED EMBODIMENTS

The preferred embodiment of the invention, presented hereinafter, pertains to a "load-limiting" device or "load limiter" located between the extractor and the tracking unit of a radar.

An object of the load limiter is to reduce the number of plots that have to be processed by the tracking unit. The reduction should be substantial for the "detrimental" plots, but this should not be achieved to the detriment of the "useful" plots coming from moving targets.

As shall be seen hereinafter, the plot filtering rate may advantageously depend on the saturation rate of the tracking unit: when it is far from the saturation point, the load limiter lets all the plots through. When it is close to saturation point, the load limiter filters. The load limiter can thus come into action either on an "all or nothing" basis or gradually, by the variation of a filtering threshold.

In the embodiment shown, the operation for validating each plot consists in associating an estimated value of validity with the plot. This estimated value of validity may be:

either a value defined on a single bit (true plot/false plot);

or a coefficient of likelihood, namely a coefficient of probability that the plot is true, or that it is false.

It must be noted, in the latter case, that the coefficient of probability of being true, on the one hand, and the coefficient of probability of being false, on the other hand, may be independent for one and the same plot. This results notably from the fact that the partitioning of the set of possible plots, each characterized by a set of N values of attributes, may be achieved independently for the assigning of a coefficient of probability of being true and of being false, respectively, to each sub-set of substantially homogeneous plots.

The load limiter therefore has the function of attributing a "level of confidence" to each incident plot. This "level of confidence" may be binary (true plot or false plot) or graduated (true plot/false plot likelihood).

The criteria that enables the load limiter to take its decision may be:

constant: set once and for all in the factory, using a priori knowledge on the characteristics of true and false plots, or using statistics deduced from recorded plots;

changing as a function of the real environment of the radar. In this case, the load limiter receives, from the tracking system, descriptions of "true" plots, namely descriptions of plots that have enabled a track to be maintained, or of "false" plots on the contrary.

Figure 2:
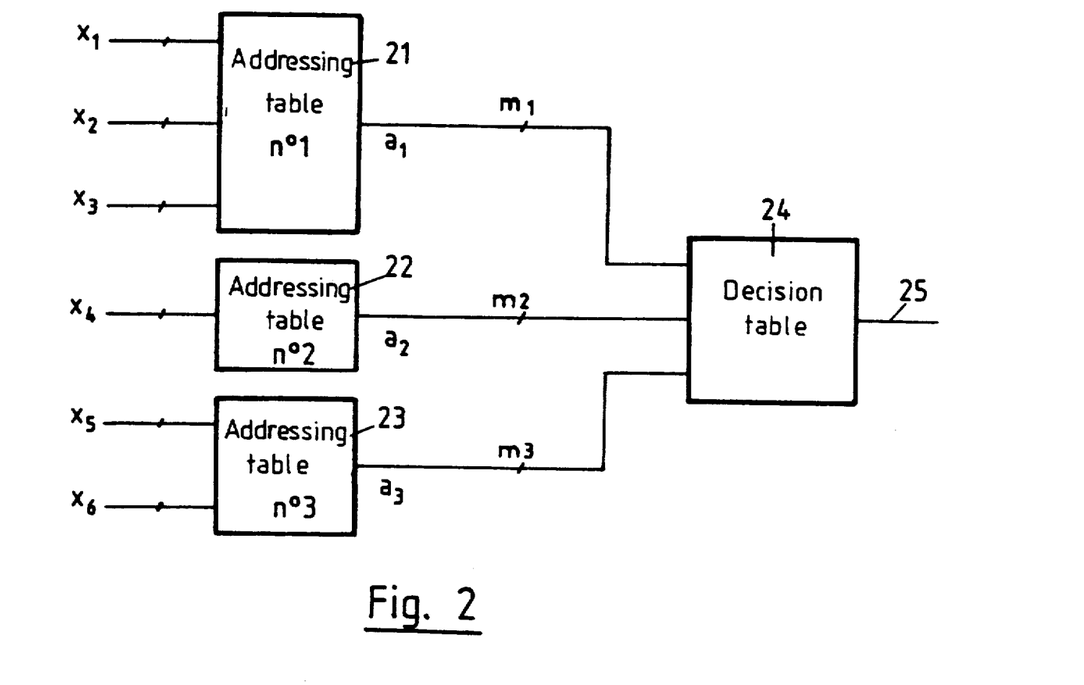
FIG. 2 is a schematic diagram of the chain of functional modules of an embodiment of the invention with a single likelihood decision table.
Figure 3:
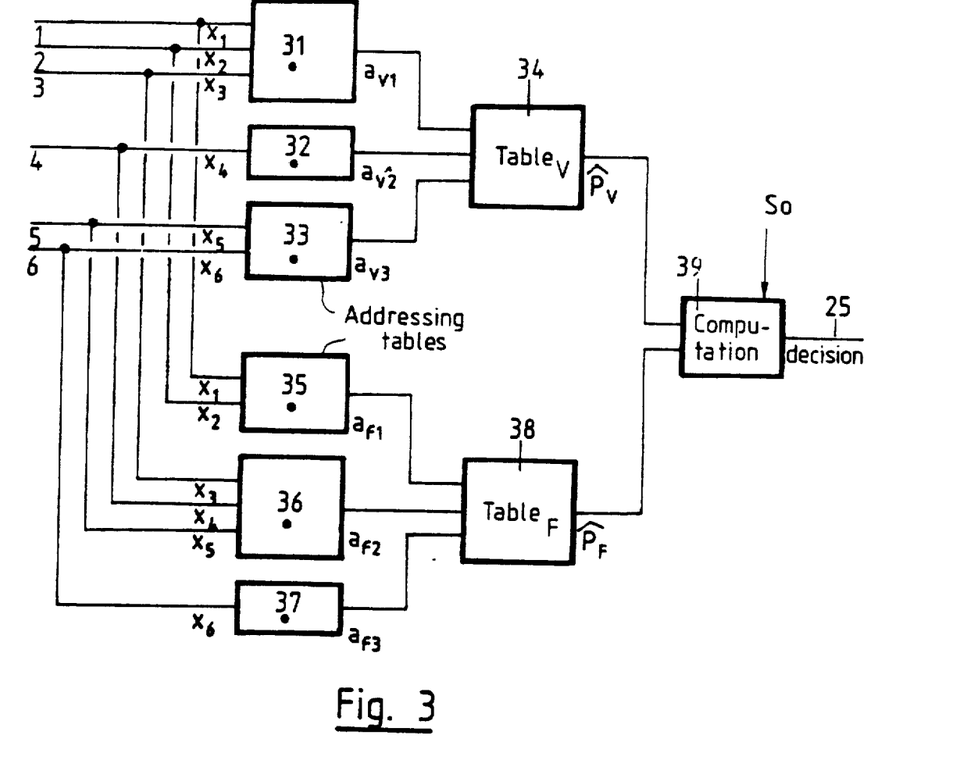
FIG. 3 is a schematic view of the chain of functional modules of an embodiment of the invention with two parallel tables for the attribution of a coefficient of probability of true plots and false plots respectively.

Two complementary aspects of the load limiter according to the invention shall therefore be described hereinafter:

The first aspect concerns an embodiment of a load limiter with constant decision criterion. This embodiment is based on an analysis of the statistics on true plots and false plots, prepared once and for all in the factory, using recordings (FIGS. 2 and 3).

The second aspect concerns a self-adaptive load limiter. The validation process is that of the first embodiment, complemented by processing means that enable the real-time updating of the statistics on true plots and false plots, and their use (FIGS. 6 to 9).

Figure 1:
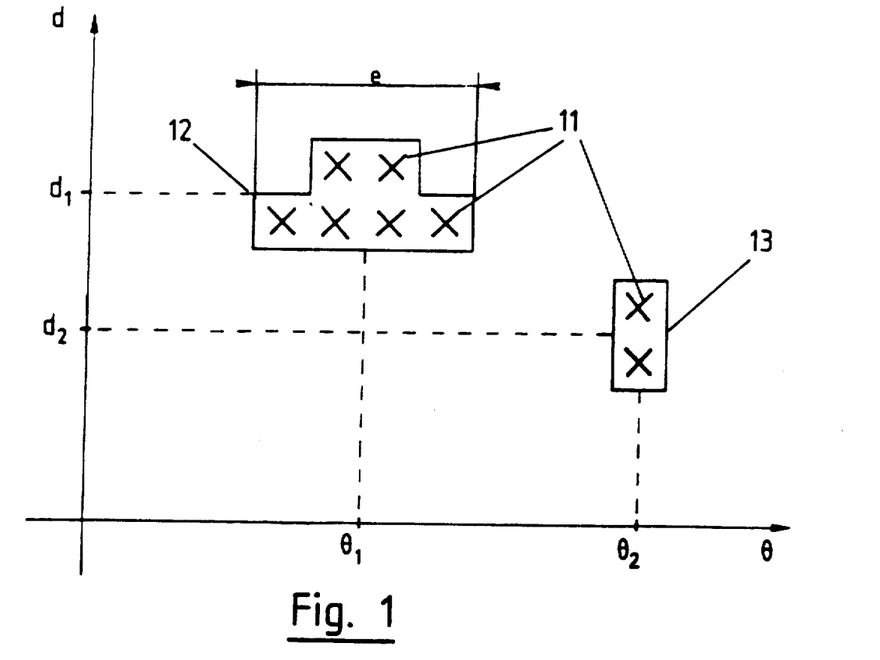
FIG. 1 illustrates some attributes of the plots, as given by the extractor of a radar.

As already mentioned in the introduction, FIG. 1 is a schematic diagram of some attributes or definition attributes of a plot, as given by the extractor of the radar. Each plot 12, 13 is generally formed by the agglomeration of elementary echos 11, which may or may not be adjacent. Each plot is characterized by attributes such as its distance from the radar $d_1$, $d_2$, its angle of sight $\theta_1$ and $\theta_2$; its extension e, etc.

The piece of data processed by the load limiter is a plot defined by an N-tuple of such attributes, for example three attributes. Tests have shown that, beyond three attributes, the gains in efficiency are no longer appreciable. Each attribute is a real parameter, represented by a whole number written on a certain number of bits, for example eight bits (the same number of bits is not necessarily written for each attribute). A plot is said to be true if it corresponds to a target that the radar deems to be useful (for example, an aircraft or missile for an anti-aircraft radar system). If not, a plot is said to be false.

The ideal goal would be for the load limiter to send the tracking unit all the true plots and no false plot. However, there are many N-tuples that may be obtained by true plots as well as by false plots. Irrespectively of the criterion chosen, it is therefore not possible to attain the ideal goal.

Besides, the criterion chosen should be achievable. This implies constraints as regards physical construction. For example, with three attributes on eight bits, it is possible to conceive of a situation where the result (true plot or false plot or level of true/false likelihood level) is tabulated with $3 \times 8 = 24$ bits, but this cannot be achieved in a simple way because it would require a memory of $2^{24} = 16.10^6$ words.

The device described enables the following two aims to be achieved:

laying down that the proportion of true plots transmitted will be at least equal to a stipulated value (for example 99%);

seeking a field where, in complying with the above assertion, the proportion of false plots transmitted is reduced to the minimum;

In mathematical terms, this is expressed as follows:

Let x be a plot, namely one N-tuple of attributes $x = (x_1, x_2, \ldots X_N)$

Let $W'1$ be the set of all the plots

Let w be a sub-set of W

Let $P_V$ and $P_F$ be two applications of W towards IR+ which verify:

$$\int_W P_V(x)dx = \int_W P_F(x)dx = 1 \tag{1}$$

$P_V$ represents the probability of a true plot having the set of attributes x.

$P_F$ represents the probability of a false plot having the set of attributes x.

The above-described decision method is then written as follows:

seek w such that $$\int_w P_V(x)dx \geq P_{V0} \text{ (stipulated value, for example: 0.99)} \tag{2}$$

and $$\int_w P_F(x)dx \text{ is minimal.} \tag{3}$$

The solution to this problem can be obtained as follows:

let us define a relationship of order in W (marked <)

$$x1 < x2 \text{ means: } \frac{P_V(x1)}{P_F(x1)} < \frac{P_V(x2)}{P_F(x2)} \tag{4}$$

let us seek $x_O$ which verifies $$\int_{x \geq x_0} P_V(x)dx = P_{V0} \tag{5}$$

let us define w as being the set of $x > x_O$ $$w = \{x | x > x_O\} \tag{6}$$

It can be shown that this definition of w meets the expressions (2) and (3).

To obtain a decision easily, it appears to be useful to tabulate the value of the decision. This makes it necessary to reduce the dynamic range of the plot to a smaller dynamic range. For example, it is possible to stipulate that the decision table should be addressed by a word described on few bits, for example a maximum of nine bits. This corresponds, for example, to an operation to quantify the value of each attribute.

Two consequences flow therefrom:

w is no longer anything other than an approach to the above-described ideal solution;

it is necessary to define the mode of passage of the plot to its partial address (for example from 24 bits to 9 bits).

The approach shown schematically in FIG. 2 consists in the use of a set of addressing tables 21, 22, 23 to obtain three partial addresses $M_1$, $M_2$, $M_3$, using six attributes, $x_1$, $x_2$, $x_3$, $x_4$, $x_5$, $x_6$.

Each addressing table 21, 22, 23, associates a partial address $a_1$, $a_2$, $a_3$ with at least one attribute $x_1$.

The size $m_1$, $m_2$, $m_3$ of the partial addresses $a_1$, $a_2$, $a_3$ is such that their sum is small enough for the decision table 24 to keep a reasonable size.

The decision table associates an estimated value of validity 25 with each M-tuple of addresses ($a_1$, $a_2$, $a_3$). This estimated value of validity 25 is either a validity bit (true/false) or a piece of information on likelihood, capable of taking several values.

It is also possible to envisage the obtaining of the partial addresses $a_1$, $a_2$, $a_3$ not through a set of addressing tables, but by means of computing modules defining limits of intervals as described further below.

In a more sophisticated variant, shown in FIG. 3, two sets of partial addresses $a_{v1}$, $a_{v2}$, $a_{v3}$ and $a_{f1}$, $a_{f2}$, $a_{f3}$ are obtained separately.

The first of these sets of partial addresses, $a_{v1}$, $a_{v2}$, $a_{v3}$, given by a first set of addressing tables 31, 32, 33, addresses a first table 34 giving an approximate value of the coefficient of probability $P_V$, corresponding to the probability that the current plot is true.

The second set of partial addresses, $a_{f1}$, $a_{f2}$, $a_{f3}$, obtained at outputs of a second set of addressing tables 35, 36, 37, addresses a table 38 giving an approximate value of the coefficient of probability $P_F$, corresponding to the probability that the current plot is false.

A computation circuit 39 uses coefficients $P_V$, $P_F$ to give a final estimated value of validity for the current plot.

This final value may be a coefficient of likelihood, equal to the ratio $P_V/P_F$. It may also be formed by a decision bit (true/false) obtained, for example, by comparing the ratio $P_V/P_F$ with a reference threshold $S_O$.

In a particular embodiment of the invention, the threshold $S_O$ may be a variable parameter, depending on the percentage of use of the processing capacities of the tracking unit, with respect to its level of saturation.

It will be noted that, in the variant of FIG. 3, the two sets of tables 31, 32, 33, on the one hand and 35, 36, 37, on the other hand, do not have the same attributes, or associations of attributes, at input. Moreover, if (in an example that is not shown) the table of each of the sets of tables should have the same inputs, the addresses at outputs of the tables $a_{vi}$, $a_{fi}$ may be different.

Figure 4:
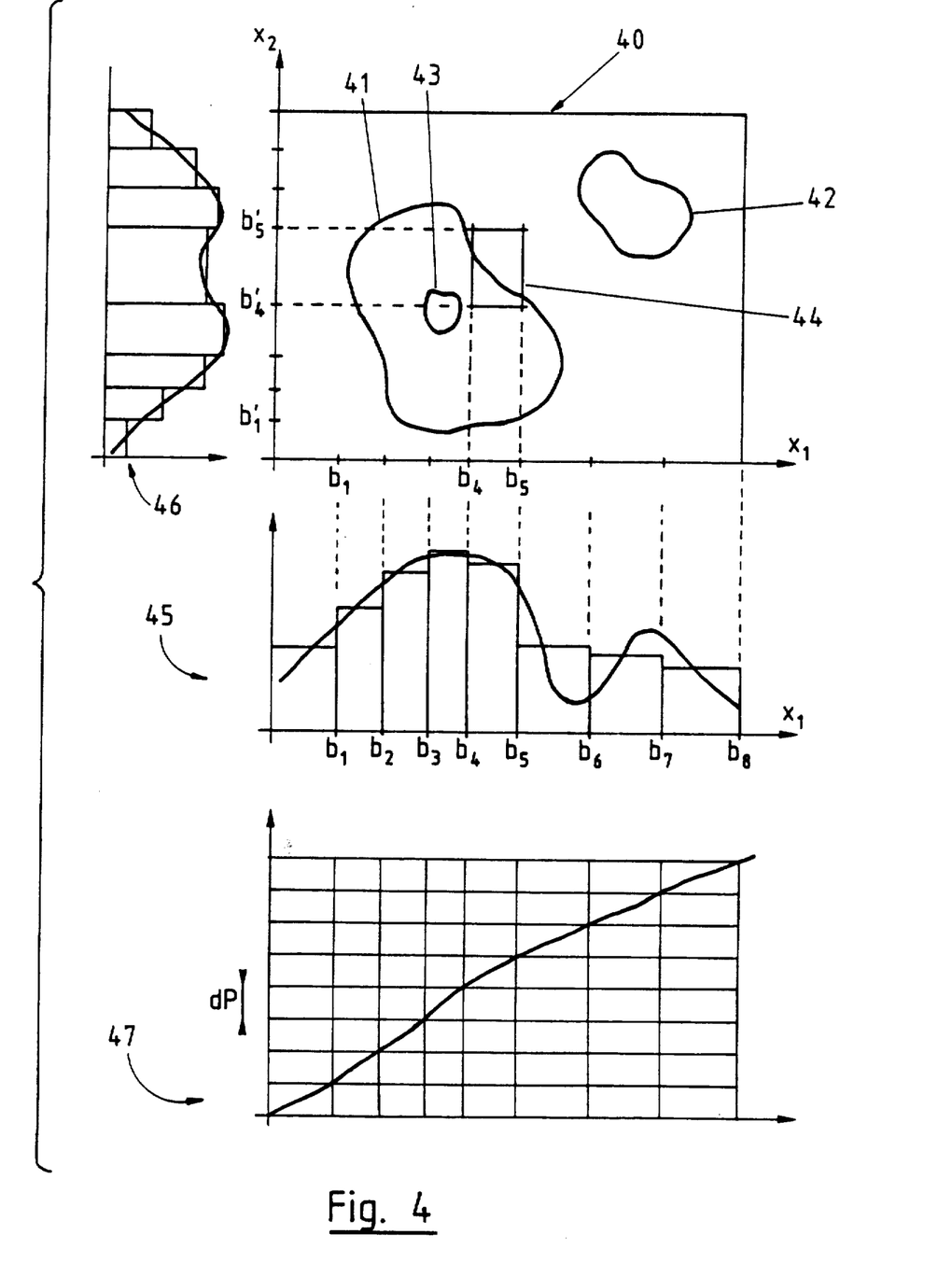
FIG. 4 is a schematic view of the principle of quantification of attributes, in the case of a validation of plots with two attributes.

FIG. 4 illustrates the principle of the construction of the addressing tables 21, 22, 23; 31, 32, 33, 35, 36, 37, by means of a process of quantification done on the range of values taken between two definition attributes of a plot.

As an example, it may be considered that each plot is written on eight bits (a whole number value between 0 and 255). The partial address computed for each attribute is expressed on three bits. Each partial address corresponds to an interval subdivided in the range (0; 255).

The diagram 40 of FIG. 4 represents the area of validity of the plots as a function of the values taken by the two plot definition attributes $x_1$, $x_2$. The level curves 41, 42, 43 subdivide the zones of increasing probability of likelihood.

The quantification operation consists in seeking seven limits $b_1$, $b_2$, $b_3$, $b_4$, $b_5$, $b_6$, $b_7$ to describe the $2^3 = 8$ intervals on the first attribute $x_1$ and again seven limits for the second attribute $x_2$.

An estimated value of validity P is associated with each rectangle (44) described by an interval ($b_4$, $b_5$) on the axis of the attribute $x_1$, and an interval ($b'_4$, $b'_5$) on the axis of the attribute $x_2$.

Figure 5A:
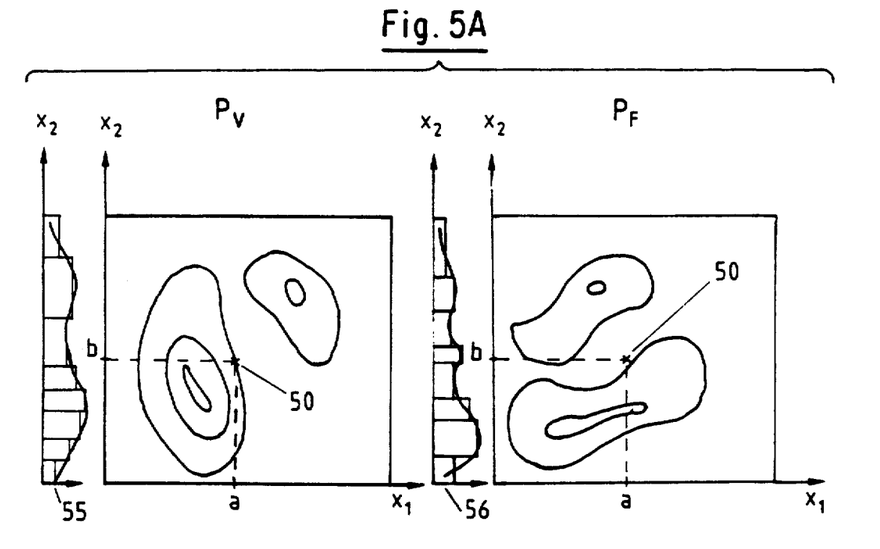
FIGS. 5a, 5b, and 5c give a schematic view of the principle by which an estimated value of validity is assigned to each two-dimensional cell, in the case of an embodiment with two validation attributes, and with parallel and independent assigning of a coefficient of probability of true plots, on the one hand, and of false plots on the other hand.
Figure 5B:
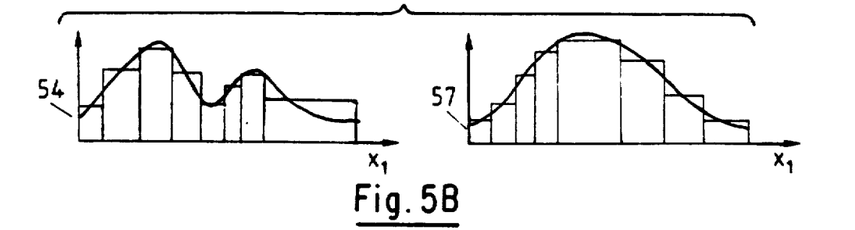
Figure 5C:
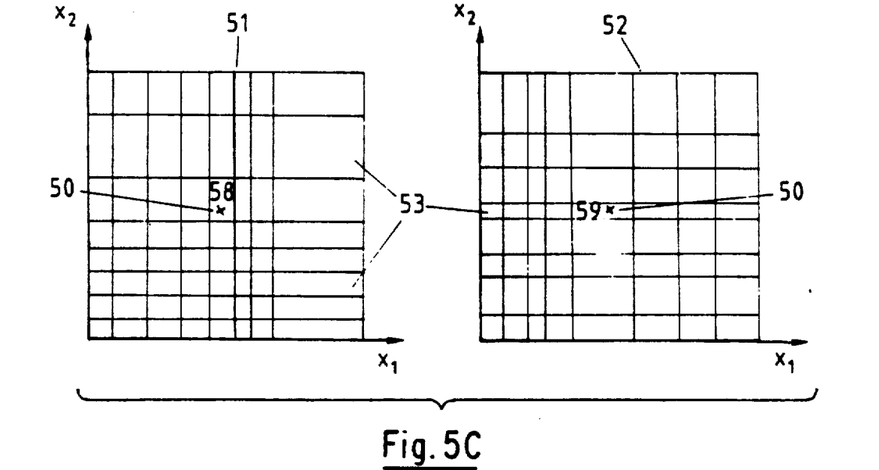
Figure 6:
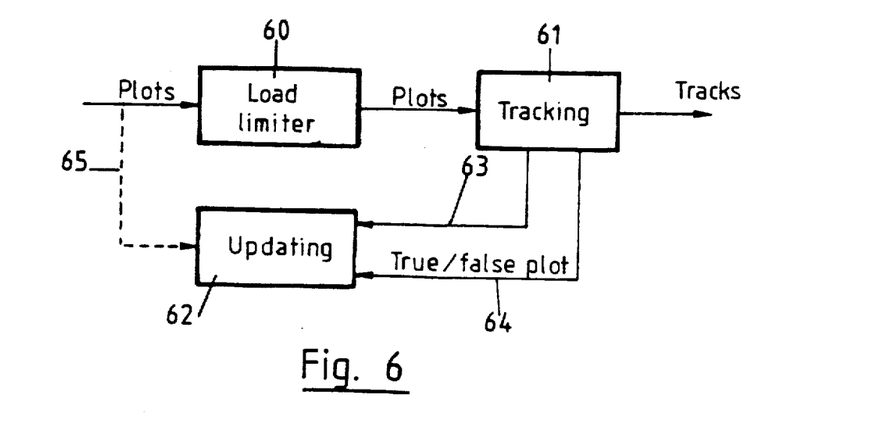
FIG. 6 illustrates the feedback chain of the plot validation method with self-adaptive updating according to the invention.

FIG. 5 illustrates the process of quantification, and of the assigning of coefficients of probability, in parallel and independently, for the likelihood of the true plot, on the one hand, and of the false plot, on the other hand.

The subdividing of each of the axes of the attributes $x_1$ and $x_2$ into eight intervals, leads to the quantification of the field of the coefficients of probability of true plots $P_V$ and false plots $P_F$, in grids 51, 52, each comprising sixty-four cells 53.

A coefficient of probability of a true plot or of a false plot, respectively, is assigned to each cell 53.

The use of these grids of quantified probability is illustrated in FIG. 5 by the plot 50, defined by its attributes: $x_1 = a$; $x_2 = b$.

The principle by which the plot 50 is assigned its estimated value of validity consists in identifying the cell 58, 59 that corresponds to it in each of the grids 51, 52. The coefficient of probability of a true plot and of a false plot, assigned to these two cells 58, 59, is then read. This enables the computation of the coefficient of likelihood of the plot, for example by computing the ratio of the coefficients $P_V/P_F$.

Several methods may be used to make the grids 51, 52.

A first subdividing method consists in performing a task of searching for an optimal choice of subdivision by computer. Advantageously, a distance value is defined, between the real value of each coefficient of probability $P_V$ and $P_F$, and their mean value, common to all the plots of one and the same cell of grids 51, 52. The minimizing of this distance value, under the constraint of the number of intervals, enables the optimal subdivision to be achieved.

An example of a distance value is:

$$\Sigma | P_V - \hat{P}_V |^2$$

with $\hat{P}_V$: real value of the probability of a real plot;

$P_V$: approximate value of the coefficient of probability of a true plot, for the cell.

Figure 10:
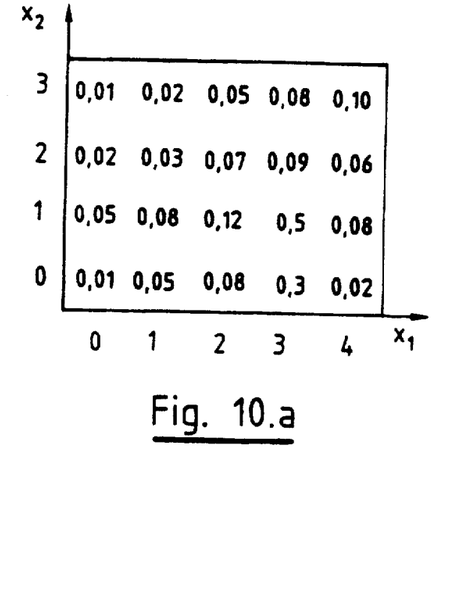
FIGS. 10a, 10b illustrate a process for the quantification of the estimated values of validity of plots, reducing a field of 20 values to 6 homogeneous cells.

FIGS. 10a, 10b illustrate a subdivision consisting in reducing a field of ten distinct values (FIG. 10a) to six homogeneous values (FIG. 10b).

The subdivision considered is purely arbitrary herein, and illustrates the fact that each of the six cells, in the grid of FIG. 10b, is associated with a single coefficient of probability value. As it happens, this value is the mean of the original values.

In a second method, which is sub-optimal as compared with the first method, but is very simple, the subdivision into intervals is sought to be made separately on each axis, using marginal probabilities obtained on the different axes, as shown in FIGS. 4 and 5.

The subdivision into intervals may be done simply, for example according to:

a linear subdivision on each attribute (intervals of the same width) without considering the probabilities;

a subdivision such that the probabilities of occurence of all the intervals is approximately equal (only approximately, for the quantification of the attribute may prevent perfect equality). This subdivision is illustrated in FIG. 4, where the intervals dP of identical value subdivide the intervals $b_1, b_2, b_3, b_4, b_5, b_6, b_7$;

a subdivision such that the preceding property is verified, not on the probability but on its derivative (taken in terms of absolute value).

The subdivision into intervals on each axis may also be done by computer, to obtain an optimum for each axis Subdivision structures are illustrated in the diagrams 45, 46 of FIG. 4, and 54, 55, 56, 57 of FIG. 5.

Irrespectively of the method chosen (comprehensive or projection on the different axes, with or without an arbitrary subdivision method), there is obtained, for each plot x, an address expressed on few bits, with which there is associated the value $P_V$.

The same method used for $P_F$ gives the intervals for $P_F$ and the values of $P_F$.

Finally, if it sought to tabulate the decision directly, it is possible to impose an identical subdivision on $P_V$ and $P_F$, and to tabulate $P_V/P_F$ or a value that depends on it (for example: Log $P_V$–Log $P_F$, binary value deduced from a comparison of $P_V/P_F$ with a threshold, etc).

It may be noted that the principle of subdividing intervals on each axis enables the attribute/partial address tables 21, 22, 23; 31 to 36 to be replaced by a simple computation for the comparison of the attribute $x_1$ with the limits ($b_{i,1}; b_{i,2}; \ldots b_{i, Ni-1}$), where $N_i$ is the number of intervals on the attribute i, to deduce therefrom the interval in which $x_i$ is located.

The examples shown in FIGS. 4 and 5 pertain to plots defined by two attributes $x_1$ and $x_2$. It is clear that the invention extends to cases where each plot is defined by a combination of the values of N attributes, forming an N-tuple associated with an N-dimensional cell. An estimated value of validity is assigned to each N-dimensional cell.

Figure 7A:
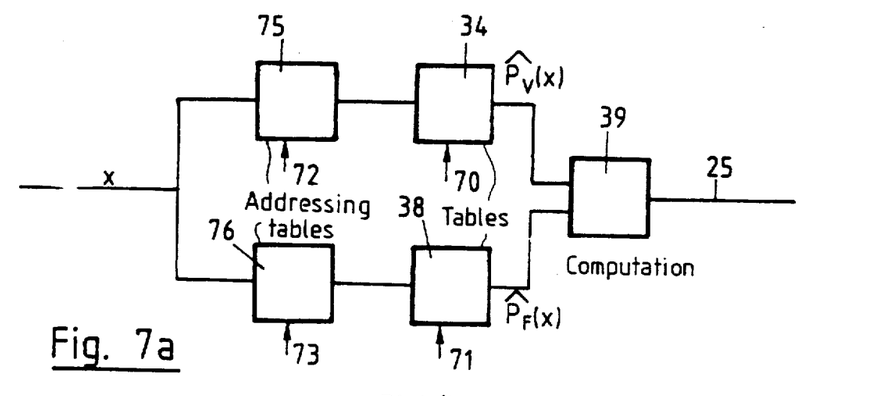
FIGS. 7a, 7b respectively represent, firstly, the functional plot validation chain under use (FIG. 7a) and, secondly, the validation process updating chain (FIG. 7b)

FIG. 7a illustrates the two aspects of the operation for updating the process for validating the plot according to the invention:

the updating of the estimated values of validity, corresponding to each cell, represented by the inputs 70, 71 in the embodiment of FIG. 7a (coefficients of probability of a true plot $P_V$ and false plot $P_F$ respectively);

the updating of the addressing tables 75, 76 and, hence, of the subdivision of the cells, represented by the inputs 72, 73 in the embodiment of FIG. 7a (choice of subdivision limits of the subdivision limits on each axis).

Figure 7B:
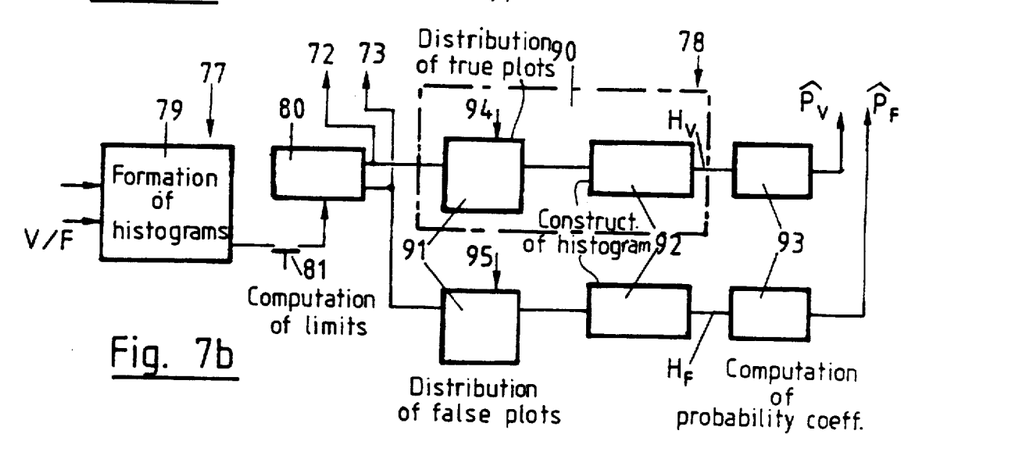

These updating values 70, 71, 72, 73 come from the updating chain of FIG. 7b.

The first part 77 of the updating chain achieves the updating of the limits on each axis. This is done in two steps:

a step 79 for the formation of histograms of the plots, by axis and hence by constituent attribute of the plots;

a step 80 for the periodic computation of the limits (or, again, for the reconstitution of the addressing tables), under periodic updating control 81. The output of this subdivision updating module gives the values 72, 73 of the new limits.

Figure 8:
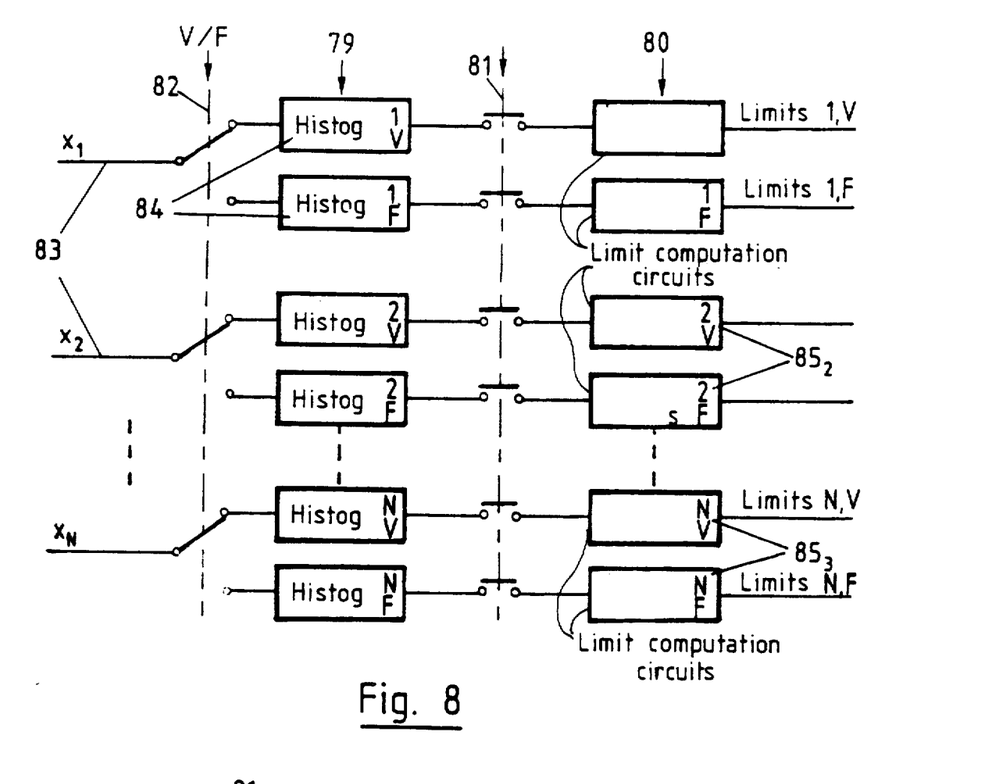
FIG. 8 gives a detailed view of the parallel branches of a device for the updating of the quantification, for each plot validation attribute, in the chain of FIG. 7b.

FIG. 8 shows a detailed view of an advantageous embodiment of the first part 77 of the updating chain in the case of an independent and parallel processing of the true plots, on the one hand, and false plots, on the other hand.

The step 7 for the formation of histograms is done in sets of two parallel sub-modules 84. A set of two sub-modules 84 is associated with each attribute $x_1, x_2, \ldots x_i$. In each set, a first histogram corresponds to the counting up of the true plots, and the second histogram corresponds to the counting up of the false plots. At each plot of attributes $x_1, x_2, \ldots x_i$, switch-over means 82 provide for the incrementation either of the first histogram or of the second histogram of each of the sets 84.

The construction of each set of histograms is done on a given batch of plots, sufficient in number to provide a representative accounting.

It will be noted that the fact of drawing up histograms, not comprehensively on all the attributes but separately, by projection on each axis (an axis may correspond to one or more attributes) enables the size of the histograms to be limited.

Thus, in the case of plots defined by three attributes of eight bits each, for example, the solution presented leads to the drawing up of three histograms of $2^8 = 256$ cells for $P_V$ and the same number of histograms, as the case may be, for $P_F$. The drawing up of a single histogram for all the attributes would have been substantially more unfavorable since it would require $2^{3 \times 8}$, namely about $16.10^6$ cells.

As a non-restrictive example, it is possible to envisage two algorithms for the subdivision of each axis into intervals, applicable when the axis corresponds to an attribute:

an "isopopulation" subdivision that consists in seeking, on each axis, the interval limits such that all the intervals substantially have the same population;

an "isosensitivity" subdivision based on the same principle as for the "isopopulation" sub-division, but done on the derivative of the histogram.

With each of these two algorithms, a number N of algorithms is thus obtained on each axis. As already noted, should 7 limits be placed on each axis, 8 intervals are defined, and hence one partial address on $\log_2 8 32 3$ bits.

If the axis is a multiple-attribute axis, it is no longer possible to use the method of subdivision into intervals. All the values that may be assumed by each attribute have to be explored. In one possible method, all the values of P are classified in ascending (or descending) order, a subdivision is done in this ordered set, for example an isopopulation type of subdivision, then each original element is assigned the interval number to which it belongs in the ordered list. It is clear that, in this case, the subdivision of the multiple-attribute axis is not expressed in the form of limits of intervals on the value of the attributes, but according to a table associating a partial address with each set of attributes of the axis.

In the embodiment of FIG. 8, the limits or addressing tables are computed independently, for each attribute (or set of attributes) $x_1, x_2, \ldots x_i$ in sets of two parallel sub-modules 85.

Figure 9:
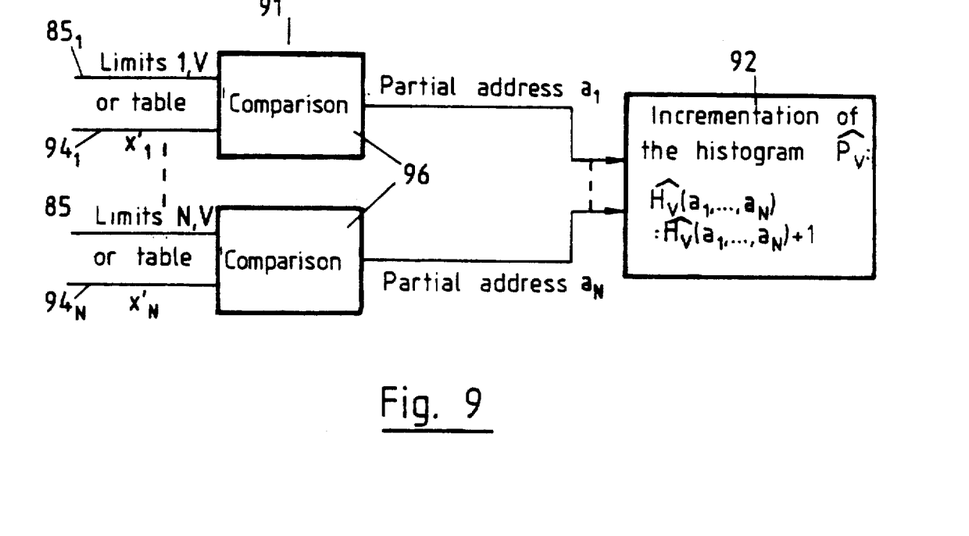
FIG. 9 gives a detailed view of a portion of a the branch for updating the coefficients of probability of true plots, in the chain of FIG. 7b.

FIG. 9 corresponds to the detail of the portion 90 of the second part 78 of the updating chain of FIG. 7b.

The part 78 of the chain 7b corresponds to the updating of the estimated values of validity. It is formed by two branches receiving, at input, the quantification characteristics 72, 73 coming from the preceding part 77 of the chain and giving, at output, the new values of the coefficients $P_V$ and $P_F$ respectively.

Of course, the estimated values of validity of the plots can be updated through an unchanged quantification structure. In this case, the part 77 of the chain is absent, or neutralized.

Each of the two parallel branches of the part 78 comprises:

a first step for the supply of a batch 94 of true plots and a batch 95 of false plots respectively;

a step 91 for the distribution of the plots 94, 95 in the different intervals of quantification;

a step 92 for the construction of histograms incrementing each cell at each occurrence of a plot having the characteristic attributes of said cell;

a step 93 for the computation of the coefficients of probability $P_V$ and $P_F$ of each cell.

As shown in FIG. 9, the step 91 for the comparison of each step with the limits, and for distribution in the quantified values of attributes, is done in parallel, for each attribute $x'_1, \ldots x'_N$, in sub-modules 96, each connected, firstly, to one of the sub-modules $85_i$ for the computation of the limits and, secondly, to the line $94_i$ for the supply of the attribute $X'_i$ of each plot of the batch for updating the estimated values of validity.

Each of the sub-modules 96 gives a partial address $a_1$. The combination of partial addresses $a_1 \ldots a_N$ of each module is supplied to the sub-module 92.

The step 93 for the computation of the coefficient of probability $P_V$ or $P_F$, can advantageously be done as follows:

for all the indices $i_1, \ldots i_N$:

$$P_V(i_1, \ldots i_N) = f(H_V(i_1, \ldots i_N))$$

example 1:

$$f(u) = \frac{u}{\text{total number of plots of the histogram}}$$

Example 2:

$f(u) = \text{Log}(u) - \text{Log(total number of plots of the histogram)}$ wherein:

$P_V$ () represents the coefficient of probability of a true plot associated with the cell;

$H_V$ () represents the value of the histogram for the cell considered.

The associated limits and tables of $P_V$ and $P_F$ may correspond to fast or slow updating operations. Fast updating enables adaptation to sudden changes in the radar environment (for example, the turning on or off of jamming). This sudden change is detected either by external sensors or by the observation of a sudden inadequacy of the validation structure (for example, an abnormal percentage of the values $P_V/P_F$ greater than or below the threshold).

The slow updating enables a tracking of variations during the day (conditions of propagation, changes in the noise of receivers, ...).

In this case, the search for a new quantification structure can be done at a far slower rate than at each plot, for example at every 1024 plots, or at every 15 mins., or at every hundred antenna rotations.

Finally, it is possible to memorize limits and tables $P_V$ and $P_F$ prepared in the plant, to be used when the radar is turned on, for example.

The time constant may be obtained by a complete renewal of the partial histograms (and, hence, of new limits, and finally of new histograms $P_V$ and $P_F$), or else by giving a different weight to the new plot with respect to the former one when preparing the partial histograms:

let $n_{jk}$ be the content of the cell $j$ at the arrival of the plot $k$;

and $N_k$ the sum of the contents of all the cells at the same instant;

if $N_k$ reaches a prescribed value Nmax, then divide all the values $n_{jk}$ by 2, and obtain the new $N_k$ by addition of the new $N_{jk}$.

The effect of this is to assign a weight which twice as much as the previous ones to the new plots (index $k+1$, $k+2, \ldots$). The value Nmax enables the time constant to be set. The division by 2 can be done by a simple shift of 1 bit. This leads to a truncation and may make it necessary for the new $N_k$ to be computed by addition of $n_{j,k}$ rather then by division by 2.

What is claimed is:

1. A method for the validation of plots for radar, notably designed to be interposed between an extractor and a tracking unit of said radar to associate an estimated value of validity with each plot given by the extractor, wherein said method comprises the steps of:
    selecting a first set and a second set of attributes, said sets of attributes being designed for a preparation of coeffecients of probability, for each plot, of its corresponding to a true plot or to a false plot, respectively;
    quantifying each attribute of said first and second sets, in defining intervals in the range of values taken by said attribute;
    associating, with each combination of the quantified values of said first and second sets of attributes, a first coefficient and a second coefficient of the probability of corresponding to a true plot and to a false plot, respectively;
    defining, for each plot, an estimated value of validity formed by a ratio of said first and second coefficients of probability.

2. A method according to claim 1, wherein said quantification operation consists in defining intervals within which the plots all have a substantially equal value of their probability of being true or of being false respectively, or intervals within which the variation curve of said probability as a function of the variation of the corresponding attribute has a substantially constant derivative.

3. A method according to claim 1, wherein said method includes a step for the self-adaptive updating of the estimated values of validity of the plots, comprising at least one of the steps of:
    updating the quantification values of the attributes defining each plot as a function of the plots received;
    updating the estimated values of validity of the plots for each combination of quantified values of attributes as a function of the final decisions on validity taken by means for using plots "informed" by their estimated value of validity.

4. A method according to claim 3, wherein said step for updating the quantification values of attributes consists in redefining the intervals subdivided in the range of values taken by each definition attribute of the plots, within a new batch of received plots.

5. A method according to claim 4, wherein said updating subdivision is done according to a logic of isopopulation or isosensitivity.

6. A method according to claim 3, wherein said step for updating the estimated values of validity of the plots consists in assigning, to each N-tuple of quantified values of attributes, an estimated value of validity obtained for the sub-set of plots verifying said N-tuple, within a new batch of received plots.

7. A method according to claim 6, wherein said step for updating the estimated values of validity of the plots is done in parallel and independently for the two sets of attributes for preparing the coefficients of probability of a true plot or a false plot respectively.

8. A method according to claim 7, wherein said updated estimated value of probability is computed by calculating, within each sub-set of plots verifying said N-tuple, the ratio of the number of the plots which, it has been decided, are true or false respectively by said means for the use of "informed" plots, to the total number of plots verifying said charcteristic N-tuple of the sub-set.

9. A method according to claim 8, wherein said updating operations are done by introducing, into each of said new batches of plots, a sample of plots representing current values of quantification and current estimated values of probability respectively.

10. A device for the validation of plots, for radar, notably designed to be interposed between an extractor and a tracking unit of said radar to associate an estimated value of validity with each plot given by the extractor, each plot being defined by an N-tuple formed by a combination of quantified values of N attributes, each quantified in defining intervals in the range of values taken by said attribute, where N is a positive integer, said device comprising:
first means to reduce the dynamic range of each plot, formed by a set of addressing tables, each table associating one of the quantified values constituting the N-tuple with each attribute value of said plot;
second means to validate each plot, formed by an addressing table associating, with each N-tuple, an estimated value of validity of the corresponding plot.

11. A device for the validation of plots, for radar, notably designed to be interposed between the extractor and the tracking unit of said radar to associate, an estimated value, of validity with each plot given by the extractor, each plot being defined by a first and a second set of attributes associated respectively with the computation of a coefficient of probability for said plot to correspond to a true plot and to a false plot, each attribute being quantified in the form of a quantified value by defining intervals in the range of values taken by said attribute, said device comprising:
first parallel means to reduce the dynamic range of each plot formed, firstly, by a first set of addressing tables, each table of which associates one of said quantified values with each attribute value of the first set of attributes and, secondly, a second set of addressing tables, each table of which associates one of said quantified values with each attribute value of the second set of attributes;
second parallel means of conversion, formed by a first addressing table which associates, with a N-tuple of quantified values taken by said first set of attributes, a coefficient of probability of corresponding to a true plot, and by a second addressing table which associates, with a N'-tuple of values taken by said second slot of attributes, a coefficient of probability of corresponding to a false plot, where N and N' are positive integers;
third means of validation of each plot, formed by a circuit to compute said estimated value of validity of the plot by the division of said first ind second coefficients of probability obtained at output of said second parallel means of conversion.

12. A device according to claim 10 or 11, wherein said first means to reduce the dynamic range of each plot are formed by modules to compute the quantification interval to which the value of each of said attributes belongs, replacing said addressing tables.

13. A device according to claim 10 or 11, wherein said device further comprises means to attribute, to each plot, one of the two states, true/false, of a validity bit of the plot, by a comparison of said estimated value of validity with a pre-determined threshold of validity.

14. A device according to claim 6, wherein said threshold of validity is variable as a function of the state of saturation of the tracking unit.

* * * * *